US011707075B2

United States Patent
Hammer et al.

(10) Patent No.: US 11,707,075 B2
(45) Date of Patent: Jul. 25, 2023

(54) METHOD FOR FEEDING POULTRY

(71) Applicant: Alzchem Trostberg GmbH, Trostberg (DE)

(72) Inventors: Benedikt Hammer, Trostberg (DE); Stefan Greger, Wittenberg (DE)

(73) Assignee: Alzchem Trostberg GmbH, Trostberg (DE)

( * ) Notice: Subject to any disclaimer, the term of this patent is extended or adjusted under 35 U.S.C. 154(b) by 0 days.

(21) Appl. No.: 17/625,499

(22) PCT Filed: Jun. 25, 2020

(86) PCT No.: PCT/EP2020/067848
§ 371 (c)(1),
(2) Date: Jan. 7, 2022

(87) PCT Pub. No.: WO2021/018487
PCT Pub. Date: Feb. 4, 2021

(65) Prior Publication Data
US 2022/0248717 A1 Aug. 11, 2022

(30) Foreign Application Priority Data
Jul. 26, 2019 (DE) .................. 10 2019 120 246.9

(51) Int. Cl.
A23K 50/75 (2016.01)
A23K 20/142 (2016.01)
A23K 10/30 (2016.01)
A23K 20/105 (2016.01)

(52) U.S. Cl.
CPC .............. *A23K 50/75* (2016.05); *A23K 10/30* (2016.05); *A23K 20/105* (2016.05); *A23K 20/142* (2016.05)

(58) Field of Classification Search
CPC ...... A23K 50/75; A23K 20/142; A23K 10/30; A23K 20/105
See application file for complete search history.

(56) References Cited

U.S. PATENT DOCUMENTS

| 4,323,036 A * | 4/1982 | Salerno ................ A01K 39/022 119/81 |
| 2008/0161387 A1* | 7/2008 | Gastner .................... A61K 8/43 514/460 |
| 2017/0007562 A1* | 1/2017 | Rademacher-Heilshorn ............... A61K 31/198 |

FOREIGN PATENT DOCUMENTS

| CN | 108669349 A * | 10/2018 | ............. A23K 20/10 |
| EP | 1758463 A1 | 3/2007 | |
| EP | 1909601 | 4/2008 | |
| EP | 1853248 B1 | 10/2008 | |
| EP | 1909601 B1 | 5/2013 | |
| EP | 1991065 B1 | 6/2014 | |
| EP | 2170098 B1 | 7/2015 | |
| WO | 2007014756 A1 | 2/2007 | |
| WO | 2015121084 A1 | 8/2015 | |

OTHER PUBLICATIONS

Fanatico, Feeding Chickens for best health and performance, available at: https://www.thepoultrysite.com/articles/feeding-chickens-for-best-health-andperformance ; accessed on Jul. 28, 2022; published on Jan. 10, 2003 (Year: 2003).*
McMurray Staff, Don't Let Your Chickens Run Out of Water, available at: https://blog.mcmurrayhatchery.com/2015/06/24/dont-let-your-chickens-run-out-ofwater/ accessed on Jul. 28, 2022; published Jun. 24, 2015. (Year: 2015).*
International Application No. PCT/EP2020/067848, International Preliminary Reporton Patentability dated Jan. 27, 2022, 6 pages.
Chiba, "Poultry Nutrition And Feeding", Animal Nutrition Handbook, Section 12, 2014, pp. 410-425.
Baker, "Advances in Protein-amino Acid Nutrition of Poultry", Amino Acids, vol. 37, No. 1, Nov. 14, 2008, pp. 29-41.
Edwards Jr. et al., "Studies on Arginine Deficiency in Chicks", Journal of Nutrition, vol. 64, No. 2, Feb. 10, 1958, pp. 271-279.
International Application No. PCT/EP2020/067848 , "International Search Report and Written Opinion", dated Oct. 13, 2020, 12 pages.
Vranes et al., "Experimental and Computational Study of Guanidinoacetic Acid Self-aggregation in Aqueous Solution", Food Chemistry, vol. 237, Dec. 15, 2017, pp. 53-57.
Young et al., "Metabolism and Nutrition Water-holding Capacity in Chicken Breast Muscle is Enhanced by Pyruvate and Reduced by Creatine Supplements", Poultry Science, XP008053678, vol. 83, No. 3, Mar. 1, 2004, pp. 400-405.

* cited by examiner

*Primary Examiner* — W A Moore
(74) *Attorney, Agent, or Firm* — Kilpatrick Townsend & Stockton LLP

(57) ABSTRACT

The present invention relates to a method for feeding poultry during breeding, keeping or fattening of poultry, in which guanidinoacetic acid or a salt thereof is administered as a feed additive.

12 Claims, No Drawings

METHOD FOR FEEDING POULTRY

CROSS REFERENCE TO RELATED APPLICATION

This application is a U.S. national phase of International Patent Application No. PCT/EP2020/067848 filed on Jun. 25, 2020, which claims priority to German Patent Application No. 10 2019 120 246.9, filed in Germany on Jul. 26, 2019. The entire contents of all applications are hereby incorporated herein by this reference.

The present invention relates to a method for feeding poultry during breeding, keeping or fattening of poultry, in which guanidinoacetic acid or a salt thereof is administered as a feed additive.

Guanidinoacetic acid (CAS No. 352-97-6, molecular formula $C_3H_7N_3O_2$— hereinafter also referred to as GAA), also known as glycocyamine, N-amidinoglycine or N-(aminoiminomethyl)-glycine, has been available on the market for some time and is approved as a feed additive in poultry fattening. Various studies have shown, inter alia, that the use of guanidinoacetic acid during breeding, keeping or fattening of poultry results in a feed saving, an improvement in feed intake and/or an increase in the fattening performance.

Thus, European patents EP 1758463 B1, EP 1853248 B1, EP 1909601 B1, EP 1991065 B1 and EP 2170098 B1 describe feed additives based on guanidinoacetic acid and guanidinoacetic acid as a feed additive.

In the application of guanidinoacetic acid, for example as a feed additive for broilers, the guanidinoacetic acid is used in an amount of 600 mg/kg feed. Thereby, the guanidinoacetic acid is added as a solid or solid composition to the feed to be administered. In practice, it has been found that a targeted use of the active ingredient requires an effective homogenization of the feed composition due to the relatively small amount of active ingredient to be used. In practice, however, these homogenisation processes are considered to be too expensive or even inefficient in some cases.

The problem of the present invention is directed to providing a method for feeding poultry which simply, safely and reliably allows the administration of guanidinoacetic acid as a feed additive for poultry while avoiding the need for extensive mixing and homogenizing of the guanidinoacetic acid with a feed. Thereby, the full benefit of the guanidinoacetic acid to be administered during breeding, keeping or fattening of poultry should further be brought to the application.

These problems are solved by a method according to claim 1. Preferred embodiments of the invention are given in the sub claims, which may optionally be combined with each other.

Thus, according to a first embodiment, the subject matter of the present invention is a method for feeding poultry during breeding, keeping or fattening of poultry comprising the method steps,
 a. providing a feed composition, and
 b. providing an aqueous solution comprising at least one feed additive,
wherein the feed composition and the aqueous solution are each provided ad-libitum for feeding the poultry, and wherein the solution comprises guanidinoacetic acid and/or a salt thereof as a feed additive, and the solution has a concentration of guanidinoacetic acid in water of from 50 to 1200 mg/l.

Thus, a method for feeding poultry can be provided avoiding extensive mixing and homogenizing of a feed composition with the guanidinoacetic acid to be administered as a feed additive. Thus, in particular, a method can also be provided in which the amount of guanidinoacetic acid to be administered can be adjusted independently of a feed composition. These are valuable advantages in the administration of guanidinoacetic acid, since even comparatively small differences in amount have an influence on the effectiveness as a feed additive. The method provided can thus be described as simple in application as well as safe and reliable in handling.

Inventively, the feed composition as well as the aqueous solution is provided ad libitum for feeding the poultry. In the context of the present invention, the term ad libitum is intended to mean an amount of feed composition and an amount of aqueous solution which exceeds the daily requirement of feed and water for feeding each individual under consideration or, in relation to the entirety of individuals under consideration, the daily requirement for feeding the entirety of individuals. Thus, according to the present invention, the feed composition and the aqueous solution are to be provided ad libitum, i.e. in excess, for the free use for poultry.

Thus, the administration of guanidinoacetic acid according to the invention is clearly different from a specific administration of an active ingredient which is administered, for example, daily in the form of a defined amount of 500 mg per day in individual doses and independently of further food products or food. It is all the more surprising that the mere provision of guanidinoacetic acid or a salt thereof ad libitum, namely at the free disposal of the poultry, in the aqueous solution in an amount of 50 to 1200 mg/l water leads to the desired success, namely a feed saving.

The concentration of guanidinoacetic acid in the aqueous solution has been selected to be limited to a very low concentration in accordance with the invention, as this enables the poultry to simultaneously take up an amount of water necessary for the poultry's usual living requirements or fattening, an amount of feed composition necessary for the poultry's usual living requirements or fattening, and at the same time an amount of guanidinoacetic acid as required. In this regard, it should be noted that the feed composition and the aqueous solution are provided ad libitum and that the poultry takes up the provided water or the aqueous solution as well as the balanced feed composition on its own motion.

Overall, however, it was not anticipated that the given concentration and amount of solution would result in the desired benefit, in particular since the guanidinoacetic acid and feed composition are offered to the poultry in two different dosage forms. It is completely surprising that a feed saving can be realized with the amount and concentration of solution according to the invention.

According to the invention, the aqueous solution provided comprises guanidinoacetic acid and/or a salt thereof, the solution having a concentration of guanidinoacetic acid in water of from 50 to 1200 mg/l. However, the concentration of the aqueous solution may be varied depending on the size, age and/or weight of the poultry. Preferably, the solution has a concentration of guanidinoacetic acid in water of at least 50 mg/l, more preferably of at least 100 mg/l, and simultaneously or independently thereof further preferably of at most 1200 mg/l, more preferably of at most 1000 mg/l, more preferably of at most 800 mg/l, more preferably of at most 600 mg/l, particularly preferred of at most 500 mg/l, particularly preferred of at most 400 mg/l and most preferably of at most 300 mg/l.

Preferably, the solution has a concentration of guanidinoacetic acid in water of from 100 to 800 mg/l, particularly preferred from 100 to 500 mg/l, and most preferably from 100 to 300 mg/l.

It is further preferred that the feed composition and the aqueous solution are provided separately from each other. It is particularly preferred that the aqueous solution is provided in bell machines and/or that the feed composition is provided in open feed troughs.

When carrying out the observations on the effectiveness of aqueous solutions comprising guanidinoacetic acid and/or a salt thereof in the fattening of broilers, it has been shown that a significant realization of feed savings is achieved when the feed composition and the aqueous solution are provided spatially separated from each other. By spatially separated provision, according to the present invention, it is meant that the feed composition is provided in a first room and the aqueous solution is provided in a second room which is separate from the first room and which is connected to the first room by means of a passage which can be passed by the poultry.

For example, the feed composition may be provided in a free run for the poultry and the aqueous solution may be provided in a feed hall or vice versa. However, spatially separated provision according to the present invention can also be realized if the feed composition is provided in a first area of a room and the aqueous solution is provided in a second area of the same room distanced from the first area. Essential with respect to the spatially separated provision is that there is a sufficient distance between the provision station for the feed composition and the provision station for the aqueous solution. Preferred in this respect as sufficient distance is a distance between the provision station for the feed composition and the provision station for the aqueous solution of more than 2 m, in particular more than 6 m and particularly preferred of more than 10 m and independently or simultaneously thereof of at most 100 m.

In this regard, it is particularly preferred that the aqueous solution is provided in bell machines and/or that the feed composition is provided in open feed troughs.

Most preferably, the aqueous solution and/or the feed composition is provided fresh daily.

It has been shown that freshly provided aqueous solutions and/or freshly provided feed compositions are readily and unhesitatingly accepted by poultry as food sources. In this respect, it has been shown that aqueous solutions comprising water from the group of drinking water, spring water, well water or tap water are preferred.

Particularly preferred, the method according to the invention can be carried out for feeding poultry, in particular poultry selected from the group consisting of ducks, geese, hens, chickens, laying hens, broilers, turkeys, quails, ostriches and turkey hens.

With the observations carried out and the evaluation of their results, it has been shown that the inventive method is not limited to the use of guanidinoacetic acid as such. Rather, it has been shown that both guanidinoacetic acid as such and a salt of guanidinoacetic acid as well as guanidinoacetic acid as such and a salt of guanidinoacetic acid can be used in the method. Particularly preferably, a salt selected from the group of alkaline or alkaline earth metal salts of guanidinoacetic acid can be used as the salt. Most preferably, sodium guanidinoacetate, potassium guanidinoacetate, magnesium guanidinoacetate or calcium guanidinoacetate can be used.

Furthermore, with the observations underlying the invention, it has been shown that the feed composition used should have a defined calorific value. On the one hand, the feed composition should not fall below a calorific value defined for normal nutrition and healthy growth, and on the other hand, it should not exceed such a calorific value in order to avoid obesity. Thus, good results have been shown when the feed composition has a calorific value of from 8 to 20 MJ per 1 kg of feed composition, in particular from 10 to 15 MJ per 1 kg of feed composition, and/or the feed composition is a balanced feed composition, and/or the feed composition is a feed composition according to Animal Nutrition Handbook, $3^{rd}$ Revision, 2014 Section 12, Poultry Nutrition and Feeding.

Particularly preferred is a balanced feed composition which is a feed composition according to Animal Nutrition Handbook, 3rd Revision, 2014 Section 12, Poultry Nutrition and Feeding.

Simultaneously or independently thereof, the method may be particularly preferred when the feed composition comprises at least one grain, a grain flour, a grain meal or an extract thereof. Further preferred is a method in which the feed composition comprises at least one grain, a grain flour, a grain meal or extract thereof, and the grain, grain flour, grain meal or extract thereof is selected from at least one of groups a. to e., namely:
  a. corn, corn flour, corn meal or an extract thereof,
  b. millet, millet flour, millet meal or an extract thereof,
  c. soy, soy flour, soy meal or an extract thereof,
  d. wheat, wheat flour, wheat meal or an extract thereof, and/or
  e. barley, barley flour, barley meal or an extract thereof.

Furthermore, the method can be carried out particularly preferably if the feed composition comprises at least one further feed additive, in particular a further feed additive from the group of minerals, amino acids and vitamins. Most preferably, this feed additive may be selected from the group consisting of calcium carbonate, mono- or dicalcium phosphate, lysine, methionine, threonine, thryptophan, valine, arginine and vitamins, and mixtures thereof.

In a particularly preferred embodiment, a feed composition is used which does not itself contain guanidinoacetic acid. In this particularly preferred embodiment, guanidinoacetic acid is provided merely as a feed additive in the aqueous solution.

A preferred feed composition, which can be used in particular as a pre-starter feed, comprises:
50 to 65% by weight, in particular 55 to 60% by weight of corn,
20 to 45% by weight, in particular 23 to 27% by weight of vegetable oil,
25 to 40% by weight, in particular 35 to 40% by weight of soy (DOC 45%),
3.0 to 4.5% by weight, in particular 3.5 to 4.0% by weight of salt (sodium chloride),
14 to 18% by weight, in particular 15 to 17% by weight of dicalcium phosphate,
10 to 12% by weight, in particular 11.0 to 11.8% by weight of calcium carbonate,
2.0 to 3.0% by weight, in particular 2.6 to 3.0% by weight of DL-methionine,
1.0 to 2.5% by weight, in particular 2.0 to 2.2% by weight of L-lysine HCl,
0.30 to 0.40% by weight, in particular 0.30 to 0.35% by weight of L-threonine,
0.00 to 0.03% by weight, in particular 0.01 to 0.02% by weight of L-tryptophan,
0.5 to 1.5% by weight, in particular 0.9 to 1.1% by weight of choline chloride, 60% feed grade, 0.5 to 1.5% by weight, in particular 0.9 to 1.1% by weight of Na—Ca—Al silicate (toxin binder), 0.5 to 1.5% by weight, in particular 0.9 to 1.1% by weight of mineral premix, 0.40 to 0.60% by weight, in particular 0.45 to 0.55% by weight of coccidiostat (dinitro-o-toluamide), 0.40 to 0.60% by weight, in particular 0.45 to 0.55% by weight of bacitracin methylene disalicylate, and 0.40 to 0.60% by weight, in particular 0.45 to 0.55% by weight of vitamin premix.

A preferred feed composition, which can be used in particular as a starter feed, comprises:

50 to 65% by weight, in particular 58 to 62% by weight of corn, 20 to 45% by weight, in particular 35 to 40% by weight vegetable oil, 25 to 40% by weight, in particular 30 to 35% by weight of soy (DOC 45%), 3.0 to 4.5% by weight, in particular 3.5 to 4.0% by weight of salt (sodium chloride), 14 to 18% by weight, in particular 16.5 to 17.5% by weight of dicalcium phosphate, 10 to 12% by weight, in particular 11.0 to 11.8% by weight of calcium carbonate, 2.0 to 3.0% by weight, in particular 2.3 to 2.7% by weight of DL-methionine, 1.0 to 2.5% by weight, in particular 1.9 to 2.1% by weight of L-lysine HCl, 0.30 to 0.40% by weight, in particular 0.32 to 0.37% by weight of L-threonine, 0.00 to 0.03% by weight, in particular 0.00% by weight of L-tryptophan, 0.5 to 1.5% by weight, in particular 0.9 to 1.1% by weight of choline chloride, 60% feed grade, 0.5 to 1.5% by weight, in particular 0.9 to 1.1% by weight of Na—Ca—Al silicate (toxin binder), 0.5 to 1.5% by weight, in particular 0.9 to 1.1% by weight of mineral premix, 0.40 to 0.60% by weight, in particular 0.45 to 0.55% by weight of coccidiostat (dinitro-o-toluamide), 0.40 to 0.60% by weight, in particular 0.45 to 0.55% by weight of bacitracin methylene disalicylate, and 0.40 to 0.60% by weight, in particular 0.45 to 0.55% by weight of vitamin premix.

A further preferred feed composition, which can be used in particular as a finisher feed, comprises:

50 to 65% by weight, in particular 61 to 64% by weight of corn, 20 to 45% by weight, in particular 38 to 42% by weight of vegetable oil, 25 to 40% by weight, in particular 27 to 31% by weight of soy (DOC 45%), 3.0 to 4.5% by weight, in particular 3.5 to 4.0% by weight of salt (sodium chloride), 14 to 18% by weight, in particular 14.5 to 16.5% by weight of dicalcium phosphate, 10 to 12% by weight, in particular 10.5 to 11.5% by weight of calcium carbonate, 2.0 to 3.0% by weight, in particular 2.0 to 2.5% by weight of DL-methionine, 1.0 to 2.5% by weight, in particular 1.0 to 1.5% by weight of L-lysine HCl, 0.30 to 0.40% by weight, in particular 0.34 to 0.38% by weight of L-threonine, 0.00 to 0.03% by weight, in particular 0.00% by weight of L-tryptophan, 0.5 to 1.5% by weight, in particular 0.9 to 1.1% by weight of choline chloride, 60% feed grade, 0.5 to 1.5% by weight, in particular 0.9 to 1.1% by weight of Na—Ca—Al silicate (toxin binder), 0.5 to 1.5% by weight, in particular 0.9 to 1.1% by weight of mineral premix, 0.40 to 0.60% by weight, in particular 0.45 to 0.55% by weight of coccidiostat (dinitro-o-toluamide), 0.40 to 0.60% by weight, in particular 0.45 to 0.55% by weight of bacitracin methylene disalicylate, and 0.40 to 0.60% by weight, in particular 0.45 to 0.55% by weight of vitamin premix.

The following examples are provided to illustrate the present invention.

EXAMPLES 483 one-day-old chicks (Cobb 400 type, male) are distributed in 21 units (replicates) of 23 chicks each. The feed used is that recommended by the supplier for Cobb 400 chicks (according to Table 1a and 1b), wherein 3 growth phases (pre-starter: age 1 to 14 days; starter: age 15 to 28 days; finisher: age 29 to 42 days) are distinguished.

TABLE 1a

Composition of the feed (depending on age)

| Component | Pre-Starter g | Starter g | Finisher g |
|---|---|---|---|
| Corn | 568.1 | 591.8 | 630.8 |
| Vegetable oil | 25.5 | 38.1 | 40.1 |
| Soy (DOC 45%) | 365.4 | 329.1 | 290.7 |
| Salt (sodium chloride) | 3.718 | 3.715 | 3.705 |
| Dicalcium phosphate | 16.434 | 16.914 | 15.587 |
| Calcium carbonate | 11.483 | 11.479 | 11.164 |
| DL-methionine | 2.823 | 2.478 | 2.221 |
| L-lysine HCl | 2.118 | 1.977 | 1.333 |
| L-threonine | 0.328 | 0.348 | 0.360 |
| L-tryptophan | 0.016 | 0.000 | 0.000 |
| Choline chloride, 60% feed grade | 1.000 | 1.000 | 1.000 |
| Na-Ca-Al silicate (toxin binder) | 1.000 | 1.000 | 1.000 |
| Mineral premix | 1.000 | 1.000 | 1.000 |
| Coccidiostat (dinitro-o-toluamide) | 0.500 | 0.500 | 0.500 |
| Bacitracin Methylene disalicylate | 0.500 | 0.500 | 0.500 |
| Vitamine premix | 0.500 | 0.500 | 0.500 |

TABLE 1b

Nutrient composition of the feed

| Nutrient component | Pre-Starter | Starter | Finisher |
|---|---|---|---|
| Energy (MJ/kg) | 12.56 | 12.98 | 13.19 |
| Proteins (%) | 22 | 21 | 19 |
| Dig. lysine (%) | 1.250 | 1.150 | 1.000 |
| Dig. methionine (%) | 0.570 | 0.520 | 0.480 |
| Calcium (%) | 0.850 | 0.850 | 0.800 |
| available phosphorus (%) | 0.430 | 0.430 | 0.400 |
| Sodium (%) | 0.160 | 0.160 | 0.160 |
| Dig. tryptophan (%) | 0.220 | 0.201 | 0.184 |
| Dig. threonine (%) | 0.770 | 0.720 | 0.670 |

The feed was given in coarse meal form (mash) ad libitum, during the experiment the feed was stored in a cool and dry place.

The water or the aqueous solution of guanidinoacetic acid in water was also offered ad libitum through bell watering places.

For better comparability, comparative experiment A and the following two experiments according to the invention (B and C) were carried out simultaneously side by side with the same feed and the same number of chicks. The temperature during the experiment was between 23° C. (at night) and 31° C. (during the day), the relative humidity was between 52 and 86%. The total duration of the experiment was 6 weeks (42 days).

After the 1st week, after the 4th week and after the 6th week (end of experiment), the body weights (BWG in g) and the amount of feed consumed (FI in g) were determined per unit (replicate), respectively, and from this the feed conversion rate (FCR) was determined. The lower the FCR, the less feed the chicken consumes for growth, the more efficient the feed input.

At the end of the experiment, 20 chickens corresponding to the average in terms of weight were selected from the experimental groups and the slaughter parameters RTC (ready to cook yield in g) and breast meat percentage (in g) were determined.

Experiment A: Normal drinking water was used here
Experiment B: The drinking water contained 200 mg/l guanidinoacetic acid
Experiment C: The drinking water contained 267 mg/l guanidinoacetic acid The drinking water containing GAA was prepared fresh daily in barrels and was then transferred to the bell watering places as required; the consumption of drinking water was determined daily to determine the intake of GAA and make adjustments as necessary.

Results:

TABLE 2

| | | Week 1 | | | Week 4 | | | Week 6 | | |
|---|---|---|---|---|---|---|---|---|---|---|
| Experiment | GAA | BWG, g | FI, g | FCR | BWG, g | FI, g | FCR | BWG, g | FI, g | FCR |
| A | 0 | 144.4 | 155.2 | 1.075 | 1329 | 1922 | 1.446 | 2593 | 4295 | 1.657 |
| B | 200 mg/l | 143.8 | 152.5 | 1.061 | 1311 | 1886 | 1.439 | 2588 | 4272 | 1.651 |
| C | 267 mg/l | 145.2 | 152.9 | 1.054 | 1324 | 1905 | 1.439 | 2604 | 4277 | 1.643 |

Weight gain and feed conversion rate

The feed conversion rate (FCR) improves significantly when GAA is added to the drinking water.

a) Slaughter result

TABLE 2

Slaughter weight and breast weight

| Experiment | Concentration GAA | RTC | Breast weight |
|---|---|---|---|
| A | 0 | 754 g | 257 g |
| B | 200 mg/l | 766 g | 263 g |
| C | 267 mg/l | 787 g | 266 g |

At a comparable body weight, the usable carcass has a significant increase when GAA is added to the drinking water, also the weight of the higher priced breast meat increases.

The invention claimed is:

1. Method for feeding poultry during breeding, keeping or fattening of poultry comprising the method steps:
   a. providing a feed composition having a caloric value of from 10 to 15 MJ per 1 kg feed composition; and
   b. providing an aqueous solution comprising at least one feed additive,
   wherein the feed composition and the aqueous solution are each provided ad-libitum for feeding the poultry; and
   administering the feed composition and the aqueous solution comprising at least one feed additive to poultry;
   wherein the aqueous solution comprises guanidinoacetic acid and/or a salt thereof as a feed additive, and the aqueous solution has a concentration of guanidinoacetic acid in water of from 100 to 300 mg/l.

2. The method according to claim 1, wherein the feed composition and the aqueous solution are provided separately or spatially separated from each other.

3. The method according to claim 1 wherein the aqueous solution is provided in bell machines and/or the feed composition is provided in open feed troughs.

4. The method according to claim 1, wherein the solution comprises water selected from the group consisting of drinking water, spring water, well water and tap water.

5. The method according to claim 1 wherein the poultry is selected from the group consisting of ducks, geese, hens, chickens, laying hens, broilers, turkeys, quails, ostriches and turkey hens.

6. The method according to claim 1 wherein the aqueous solution comprises guanidinoacetic acid and/or a salt of guanidinoacetic acid selected from the group of alkaline or alkaline earth salts of guanidinoacetic acid.

7. The method according to claim 6, wherein the aqueous solution comprises sodium guanidinoacetate, potassium guanidinoacetate, magnesium guanidinoacetate or calcium guanidinoacetate.

8. The method according to claim 1, wherein the feed composition comprises at least one grain, a grain flour, a grain meal or an extract thereof.

9. The method according to claim 8, wherein the feed composition is selected from one of the groups a. to e.,
   a. corn, corn flour, corn meal or an extract thereof,
   b. millet, millet flour, millet meal or an extract thereof,
   c. soy, soy flour, soy meal or an extract thereof,
   d. wheat, wheat flour, wheat meal or an extract thereof, and/or
   e. barley, barley flour, barley meal or an extract thereof.

10. The method according to claim 1, wherein the feed composition comprises at least one further feed.

11. The method of claim 10, wherein the feed composition comprises a further feed additive from the group of minerals, amino acids and vitamins.

12. The method of claim 11, wherein the feed composition comprises a further feed additive selected from the group of calcium carbonate, dicalcium phosphate, lysine, methionine, threonine, thryptophan, valine, arginine and mixtures thereof.

* * * * *